3,299,476
INJECTION MOLDING CUT-OFF DEVICE
Donald B. McIlvin, Danvers, Mass., assignor to United Shoe Machinery Corporation, Boston, Mass., a corporation of New Jersey
Filed Aug. 12, 1964, Ser. No. 389,060
7 Claims. (Cl. 18—30)

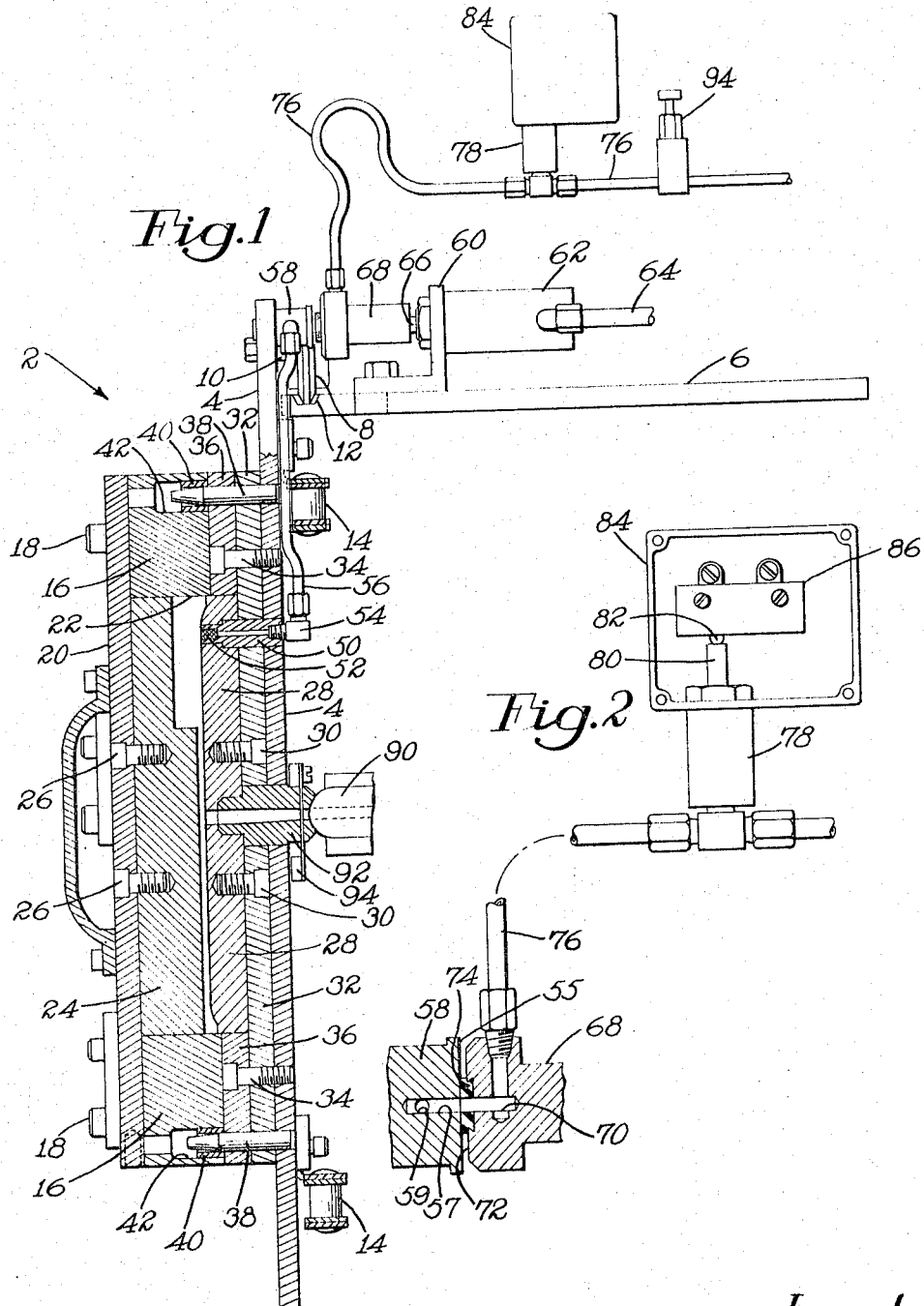

This invention relates to injection molding machines, and more particularly to pressure sensitive cut-off means which stops the flow of material into a mold cavity.

The invention is herein illustrated in its application to machines for molding shoe sole and heel units, of the type disclosed in United States patent application Serial No. 220,178, filed August 29, 1962, in the name of Paul W. Senfleben, and now Patent No. 3,172,162. While the invention is particularly applicable to machines for molding shoe soles, it is to be understood that the invention is not limited in scope to machines of this type, but is applicable to injection molding machines generally.

Such machines usually include a mold assembly having a male and female mold member, each having the peripheral shape of an article to be formed. In a shoe sole mold assembly the edge face of the sole is formed by the female mold member surrounding the male mold member in contiguous relation thereto. A telescoping engagement of the mold members closes the mold cavity and clamping means are usually employed to retain the mold members in their cooperative relationship. One of the mold members is in communication with a mold charging source which furnishes the fluid material, usually a plastic material, for filling the mold cavity.

In a mold charging operation, a timely termination of the flow of plastic is required to prevent excessively charging the mold cavity which results in unwanted "flash" formed about the edge of the sole, or at worst, a distorted sole. Generally, a mechanical device has been employed to automatically shut off the flow of plastic when the mold cavity is filled. Such shut-off devices have been actuated from a point within the mold cavity. However, experience has shown that the plastic material used in the mold causes clogging or sticking of the mechanical devices, so that the mold frequently has been excessively charged. More recently, air switches have been used to stop the flow of plastic. Usually an air channel intersects a second channel which is in communication with the mold. When the second channel has filled with plastic it blocks the flow of air through the air channel causing, by the action of appropriate switches, the termination of the flow of plastic into the mold. While such air switches have proved reliable, they necessarily leave a sprue on the sole, the sprue having been formed by the plastic which entered the second channel and there hardened. Removal of the sprue necessitates another operation on the sole, i.e., trimming off the sprue.

Accordingly, it is an object of the present invention to provide a means for terminating mold charging which is not susceptible to clogging or sticking and which does not cause the formation of a sprue on the sole.

It is a further object of the present invention to provide a pneumatic means for terminating mold charging which is reliable in operation and economical to incorporate in existing mold assemblies.

With the above and other objects in view, the present invention contemplates the provision in a mold assembly of a nozzle located in the mold cavity. The nozzle is characterized by an insert having sufficient porosity to permit the passage of air therethrough but insufficient to permit the passage of the plastic in use, for example polyvinyl chloride in a fluid state. The nozzle is arranged in flush relation to the inner surface of one mold member and delivers air into the mold cavity. Upon completion of the mold charging operation the fluid plastic covers the nozzle, preventing the passage of air therefrom into the mold cavity. Covering of the nozzle with fluid plastic diverts the flow of air to a pneumatically operated means which operates to terminate the mold charging operation.

The above and other features of the invention, including various novel details of construction and combinations of parts, will now be more particularly described with reference to the accompanying drawings and pointed out in the claims. It will be understood that the particular machine embodying the invention is shown by way of illustration only and not as a limitation of the invention. The principles and features of this invention may be employed in varied and numerous embodiments without departing from the scope of the invention.

In the drawings,

FIG. 1 is an elevational view of a sole and heel mold assembly, shown in section, and an injection cut-off means; and FIG. 2 is a side elevation of a portion of the cut-off means, showing the cover plate removed from an air switch, and showing a portion of the air system in section.

The invention is illustrated in the drawings as embodied in a machine of the type disclosed in the application of Senfleben hereinbefore referred to. Machines of this type have a plastic injecting or mold charging mechanism and a plurality of ambulatory mold assemblies each carrying mold parts for molding a shoe sole. The machine is provided with an endless conveyor system on which a plurality of ambulatory assemblies are mounted at uniformly spaced positions. The conveyor system advances the ambulatory assemblies successively to a discharging station from which a molded sole is removed or discharged from the mold assembly and the mold assembly is closed preparatory to another injection or mold charging operation. From the discharging station the ambulatory assembly is advanced in one step to the injection station in which the mold cavity is charged with fluid plastic to form another shoe sole.

Referring to FIG. 1 which shows an ambulatory mold assembly 2 in the mold charging station, the illustrated assembly is mounted on a vertically disposed carrier plate 4 which is suspended from an elevated rail 6 by means of two rolls, one of which is illustrated in FIG. 1 and identified by the numeral 8. The rolls 8 are freely mounted on the shank portion of a suitable screw 10 secured to the plate 4. The ambulatory mold assembly 2 is guided for rectilinear movement on the rail 6 by the rolls 8 which travel in a suitable groove 12 formed in the rail 6.

For conveying a plurality of ambulatory assemblies from station to station the machine is provided with two chains 14 vertically spaced from each other and mounted on suitable sprockets (not shown), one pair of sprockets being driven to actuate the chains.

Referring to the mold assembly, an outer mold member 16 is removably secured by screws 18 to a forward platen 20. The outer mold member has a sole-shaped opening extending therethrough, the wall 22 of which forms the edge face of the sole. Closely fitted into the opening in the outer mold member 16 is a bottom mold member 24 which is seated upon the inner surface of the platen 20 and removably attached thereto by screws 26. The bottom mold member 24 forms the bottom or tread surface of a sole or a sole and heel unit, as the case may be. The mold assembly is completed by an upper mold member 28 having the same peripheral shape as the bottom mold member 24 and contoured to form the upper attaching surface of the sole. When the mold assembly is closed, as shown in FIG. 1, a portion of the upper mold member 28 is received within the outer mold member 16 in telescoping engagement with the wall 22. The upper mold member 28 is removably attached by screws 30 to a rear platen 32 which is removably attached to the carrier plate 4 by screws 34. The screws 34 extend through a spacer plate 36 and attach it to the platen 32. The spacer plate 36 is substantially thinner than the outer mold member 16, but otherwise is similar in shape to said mold member. The spacer plate 36 serves to determine the extent of penetration of the upper mold member 28 into the cavity defined by the wall 22 of the outer mold member 16. For accurately registering the outer mold member 16 relatively with the upper mold member 28, two dowl pins 38 are mounted in aligned bores extending through the spacer plate 36, the rear platen 32, and the carrier plate 4. Tapered end portions of the dowel pins 38 projecting forwardly from the spacer plate 36 are received within bushings 40 during the advancement into mold closing position of the assembly comprising outer mold member 16, the bottom mold member 24, and the forward platen 20. The bushings 40 are tightly fitted into suitable counterbores 42 formed in the outer mold member 16. The opening and closing movements of the mold members are described in detail in the above mentioned patent application.

The means for controlling the mold charging operation will now be described. A bushing 50 extends through the carrier plate 4, the rear platen 32 and the upper mold member 28. Disposed in the mold cavity end of the bushing is a sintered bronze insert 52 having a porosity sufficient to permit the passage of air therethrough, but insufficient to permit the passage of plastic in a fluid state. The bushing 50 and insert 52 comprise a nozzle which is arranged in flush relation to the inner surface of the upper mold member. On the rearward end of the bushing 50, i.e. the right-hand end as viewed in FIG. 1, there is disposed a fixture 54 which receives an air line 56. The air line 56 extends to an air line mounting block 58 mounted on the upper portion of the carrier plate 4. The air line mounting block 58 has a bore 57 (FIG. 2) disposed centrally of its rearward face 55 (FIG. 2) and extending forwardly to a point where it intersects a bore 59 connected with the air line 56. Thus, the bore 57 in the rearward face of the air line mounting blocks is in communication with the interior of the mold cavity.

An angle iron 60 (FIG. 1) secured to the upper face of the elevated rail 6 retains an air cylinder 62 which receives air (from a source not shown) through an air line 64. A rod 66 extending forwardly from the air cylinder 62 has attached to its free end an air line mounting block 68. The block 68 has a bore 70 disposed centrally of its forward face 72 (FIG. 2) on which is mounted a bushing 74 having a central bore in alignment with the bore 70. A flexible air line 76 is attached to the upper portion of the air line mounting block 68 and is in communication with the bore 70, as may be seen in FIG. 2. On the air line 76 there is mounted an injection stop means including an air cylinder 78 having a rod 80 extending from the upper end thereof. The rod 80 is aligned with a microswitch button 82 located in a switch box 84. The microswitch button 82 actuates a microswitch 86 which in turn causes stoppage of the charging operation.

In the mold charging operation a charge of fluid plastic material is injected from a nozzle 90 through a suitable sprue passage in a barrel 92 fixed in the carrier plate 4 and arranged to communicate with the mold cavity. In order to prevent evacuation of fluid from the mold cavity after the barrel 92 has been disengaged from the nozzle 90 a suitable gate valve 94 is provided in that portion of the barrel 92 projecting rearwardly from the carrier plate 4. The operation of the gate valve is fully described in the above mentioned patent application.

In operation of the machine an ambulatory mold assembly 2 advances into the mold charging station with the gate valve 94 open preparatory to the mold charging operation. When the mold assembly reaches the charging station a microswitch (not shown) is actuated by its arrival which causes pressurized air to enter the air line 64 thereby causing the rod 66 and the block 68 to move forward, i.e., to the left, as shown in FIG. 1, so that the bushing 74 is urged snugly against the rearward face of the mounting block 58. When the mounting block 58 and the bushing 74 are in contact the bore in the rearward face of the mounting block 58 is aligned with the bore 70 in the block 68. Accordingly, when the mold assembly is in the charging station the air line 76 is in communication with the mold cavity. Air continuously flows in the line 76 under pressure of 5 p.s.i. or less and thereupon travels through the block 68, the block 58, the air line 56, the bushing 50, and the insert 52, into the mold cavity. The movement of the mold cavity into the injection station also causes, by means not shown, the beginning of the plastic charging operation through the nozzle 90. The low pressure air entering the mold cavity seeps out of the cavity between the various members. The fluid plastic injected through the barrel 92 into the mold cavity soon covers the nozzle. Because of the porosity of the insert 52 the plastic does not enter the nozzle; however, it does stop the flow of air into the mold cavity. Back pressure in the line 76 acts against a bellows in the air cylinder 78 which causes the rod 80 to move vertically upwardly. When the end of rod 80 strikes the microswitch button 82, the microswitch 86 is actuated and causes the termination of fluid plastic flow through nozzle 90. When the mold assembly 2 is ready to be moved out of the mold charging station, the air to line 64 is shut off by independent means (not shown). An air pressure regulator 94 may be provided on the air line 76 to facilitate maintaining the desirable low air pressure.

It is to be understood that the present invention is by no means limited to the particular construction shown in the drawings, but also comprises any modifications within the scope of the appended claims.

Having thus described my invention, what I claim as new and desire to secure by Letters Patent of the United States is:

1. In an injection molding machine, an automatic injection cut-off means comprising a nozzle interconnecting the mold cavity and a source of pressurized air, an insert in the cavity end of said nozzle having a porosity sufficient to permit the flow of air therethrough but insufficient to permit the flow of fluid plastic, and an injection stop means in communication with said air source, said injection stop means being responsive to a back pressure caused by covering of said insert with fluid plastic for terminating the flow of plastic into the mold cavity.

2. In an injection molding machine, an automatic injection cut-off means comprising a nozzle interconnecting the mold cavity and a source of pressurized air, a sintered bronze insert in the cavity end of said nozzle having a porosity sufficient to permit the flow of air therethrough but insufficient to permit the flow of fluid plastic, and an injection stop means in communication with said air source, said injection stop means being responsive to a back pressure caused by covering of said insert with fluid plastic for terminating the flow of plastic into the mold cavity.

3. In an injection molding machine, an automatic injection cut-off means comprising a source of pressurized air in communication with the mold cavity, an insert flush with the cavity side of one mold member and interconnecting the air source and the mold cavity, said insert having a porosity sufficient to permit the passage of air therethrough but insufficient to permit the passage of fluid plastic, and injection stop means in communication with said air source and responsive to back pressure caused by covering of said insert by fluid plastic for terminating the flow of said plastic into said cavity.

4. In an injection molding machine, an automatic injection cut-off means comprising a source of pressurized air in communication with the mold cavity, an insert flush with the cavity side of one mold member and interconnecting the air source and the mold cavity, said insert having a porosity sufficient to permit the passage of air therethrough but insufficient to permit the passage of fluid plastic, an air cylinder in communication with the air source, and a rod projecting from the air cylinder and aligned with a switch actuating means, said air cylinder being adapted to be energized by back pressure caused by covering of the insert by fluid plastic, whereby said rod is urged into contact with said switch actuating means for terminating the injection operation.

5. In an injection molding machine having means for stopping the injection of fluid plastic including a source of pressurized air in communication with the mold cavity, an insert flush with the cavity side of one mold member and interconnecting the air source and the mold cavity, said insert having a porosity sufficient to permit the passage of air therethrough but insufficient to permit the passage of fluid plastic, an injection stop means in communication with said air source and responsive to back pressure caused by covering of said insert by fluid plastic for terminating the flow of plastic into the mold cavity.

6. In an injection molding machine having means for stopping the injection of fluid plastic including a source of pressurized air in communication with the mold cavity, an insert flush with the cavity side of one mold member and interconnecting the air source and the mold cavity, said insert having a porosity sufficient to permit the passage of air therethrough but insufficient to permit the passage of fluid plastic, and an air cylinder in communication with the air source and responsive to back pressure caused by covering of said insert by fluid plastic to operate a switch actuating means for terminating the flow of said plastic into said cavity.

7. In an injection molding machine having ambulatory mold assemblies, an automatic injection cut-off means comprising means mounted on each mold assembly for admitting air into the mold cavity, a source of pressurized air mounted on the frame of the machine, means for interconnecting the air source and the air admitting means when the mold assembly is in a charging station, an insert at the mold cavity end of the air admitting means having a porosity sufficient to permit the flow of air therethrough but insufficient to permit the flow of fluid plastic, and injection stop means in communication with said air source and responsive to a back pressure caused by covering of said insert with liquid plastic for terminating the flow of plastic into the mold cavity.

References Cited by the Examiner

UNITED STATES PATENTS

| | | | |
|---|---|---|---|
| 3,014,242 | 12/1961 | Baker et al. | 18—30 |
| 3,025,568 | 3/1962 | Hardy | 18—30 |

J. SPENCER OVERHOLSER, *Primary Examiner.*

W. L. McBAY, *Assistant Examiner.*